United States Patent
Harada et al.

(10) Patent No.: US 8,345,706 B2
(45) Date of Patent: Jan. 1, 2013

(54) BASE STATION AND METHOD

(75) Inventors: Atsushi Harada, Kawasaki (JP); Minami Ishii, Yokohama (JP); Sadayuki Abeta, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 555 days.

(21) Appl. No.: 12/305,921

(22) PCT Filed: Jun. 19, 2007

(86) PCT No.: PCT/JP2007/062354
§ 371 (c)(1),
(2), (4) Date: Apr. 9, 2009

(87) PCT Pub. No.: WO2007/148707
PCT Pub. Date: Dec. 27, 2007

(65) Prior Publication Data
US 2010/0232303 A1   Sep. 16, 2010

(30) Foreign Application Priority Data
Jun. 19, 2006 (JP) ................................ 2006-169441

(51) Int. Cl.
H04J 3/12 (2006.01)
(52) U.S. Cl. .................. 370/464; 455/522; 455/13.4
(58) Field of Classification Search .................. 370/310, 370/329, 348, 431, 437, 441–443, 464; 455/73, 455/561, 13.4, 522, 127.1
See application file for complete search history.

(56) References Cited

U.S. PATENT DOCUMENTS 5,708,441 A * 1/1998 Kanai ........................... 342/359
6,169,759 B1 * 1/2001 Kanterakis et al. ............ 375/130
6,463,295 B1 * 10/2002 Yun ............................... 455/522
6,614,771 B1 * 9/2003 Kim et al. ...................... 370/335
(Continued)

FOREIGN PATENT DOCUMENTS

JP 2001-339458 A 12/2001
(Continued)

OTHER PUBLICATIONS

Nakanishi, et al. "Study on Interference Reduction Technique in One Cell Repeating OFDM/TDMA System Using Sub-carrier Proper carrier Proper Modulation Method," Technical Report of the Institute of Electronics, Information and Commuication Engineers, RCS2003-239, Jan. 2003, with translation of Introduction and Proposed Scheme (cited in specification), 5 pages.

(Continued)

*Primary Examiner* — Michael Thier
*Assistant Examiner* — Curtis A Alia
(74) *Attorney, Agent, or Firm* — Osha Liang LLP

(57) ABSTRACT

A base station (eNodeB) performing a radio communication with a user equipment (UE) includes: a transmission format determining unit (16) configured to determine a transmission format of a downlink data channel not to be associated by a control channel, based on a downlink reception signal quality measured by the user equipment; a notification unit (18) configured to notify, to the user equipment, the transmission format determined by the transmission format determining unit; a transmission power controlling unit (19) configured to control a transmission power of the downlink data channel; and a transmitting unit (18) configured to transmit downlink data to the user equipment via the downlink data channel, by using the transmission format determined by the transmission format determining unit.

6 Claims, 10 Drawing Sheets

U.S. PATENT DOCUMENTS

| | | | |
|---|---|---|---|
| 6,725,062 B1* | 4/2004 | Paranchych | 455/561 |
| 6,757,319 B1* | 6/2004 | Parsa et al. | 375/141 |
| 6,826,171 B1* | 11/2004 | Mueckenheim et al. | 370/347 |
| 6,868,075 B1* | 3/2005 | Narvinger et al. | 370/335 |
| 6,868,257 B1 | 3/2005 | Holma | |
| 7,180,902 B1* | 2/2007 | Raaf et al. | 370/441 |
| 7,551,596 B2* | 6/2009 | Kim et al. | 370/349 |
| 7,551,637 B2* | 6/2009 | Damnjanovic et al. | 370/412 |
| 2002/0075838 A1* | 6/2002 | Choi et al. | 370/342 |
| 2002/0082020 A1* | 6/2002 | Lee et al. | 455/450 |
| 2002/0136271 A1* | 9/2002 | Hiramatsu et al. | 375/141 |
| 2003/0002472 A1* | 1/2003 | Choi et al. | 370/347 |
| 2003/0035403 A1* | 2/2003 | Choi et al. | 370/342 |
| 2003/0117969 A1* | 6/2003 | Koo et al. | 370/318 |
| 2003/0119452 A1* | 6/2003 | Kim et al. | 455/69 |
| 2004/0022213 A1* | 2/2004 | Choi et al. | 370/332 |
| 2005/0013263 A1* | 1/2005 | Kim et al. | 370/320 |
| 2005/0136840 A1* | 6/2005 | Molnar et al. | 455/63.1 |
| 2006/0018277 A1* | 1/2006 | Petrovic et al. | 370/329 |
| 2006/0293075 A1* | 12/2006 | Kansakoski et al. | 455/522 |
| 2007/0076654 A1* | 4/2007 | Bachl et al. | 370/329 |
| 2007/0121538 A1* | 5/2007 | Ode et al. | 370/323 |

FOREIGN PATENT DOCUMENTS

| | | |
|---|---|---|
| JP | 2003-503979 A | 1/2003 |
| JP | 2005-20076 | 1/2005 |
| JP | 2006-115358 | 4/2006 |
| WO | 2004/073250 | 8/2004 |
| WO | 2005/027538 | 3/2005 |
| WO | 2005/051012 A1 | 6/2005 |

OTHER PUBLICATIONS

Yokomakura, et al. "Study on Notification of Adjacent Cell Interference Power in One Cell Repeating TDMA System Using OFDM Proper Modulation Method," the 2004 IEICE General Conference, B-5-54, 2004, with translation of Introduction and Section 2 (cited in specification), 10 pages.

International Search Report (English & Japanese) for PCT/JP2007/062354 mailed Jul. 24, 2007 (4 pages) (4 pages).

Written Opinion of ISA (Japanese) for PCT/JP2007/062354 mailed Jul. 24, 2007 (3 pages).

GPP TSG-RAN WG1 #43, R1-05-1511, Seoul, Korea, Nov. 7-11, 2005 Qualcomm Europe "HS-SCCH-less HS-PDSCH Operation for Improved Support of IMS Real-Time Services" (7 pages).

GPP TSG-RAN WG2 Meeting #51, R2-060550, Denver Colorado, USA Feb. 13-17, 2006 Qualcomm Europe "Further Details on HS-SCCH-less Operation for VoIP Traffic" (7 pages).

TSG-RAN WG1 #42bis, R1-051145, San Diego, USA, Oct. 10-14, 2005 (Original R1-050852) NTT DoCoMo et al. "CQI-Based Transmission Power Control for Control Channel in Evolved UTRA" (6 pages).

TSG-RAN WG1 #43, R1-051393, Seoul, Korea, Nov. 7-11, 2005 NTT DoCoMo et al. "CQI-Based Transmission Power Control for Control Channel in Evolved UTRA Uplink" (4 pages).

Office Action for Japanese Application No. 2008-522483 mailed Nov. 15, 2011, with English translation thereof (4 pages).

Office Action for Japanese Application No. 2008-522483 mailed Feb. 28, 2012, with English translation thereof (5 pages).

Patent Abstracts of Japan, Publication No. 2001-339458, publication date Dec. 7, 2001 (1 page).

Espacenet Bibliographic data for WO 2005/051012, publication date Jun. 2, 2005 (1 page).

* cited by examiner

FIG. 3
(a)
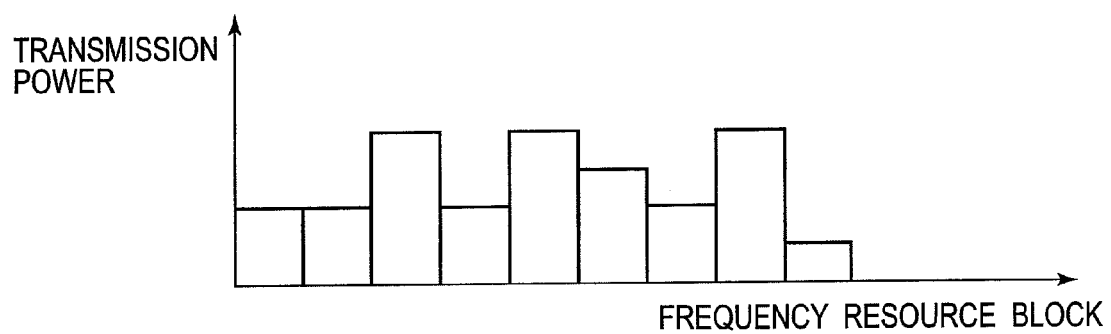
(b)
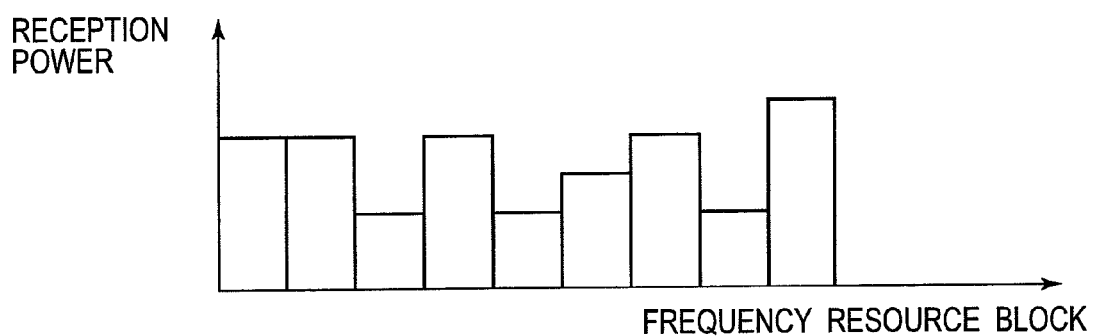

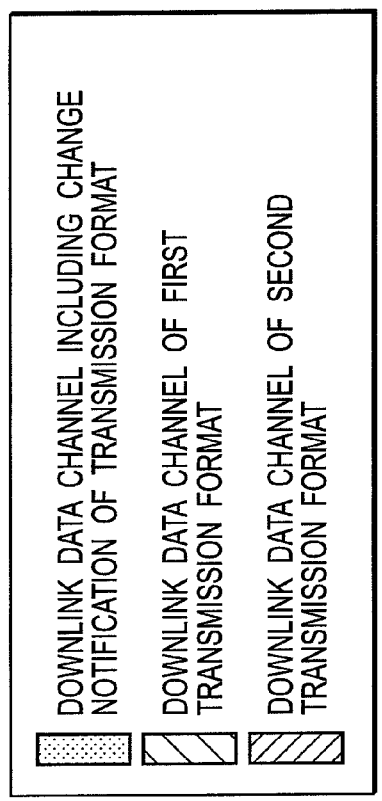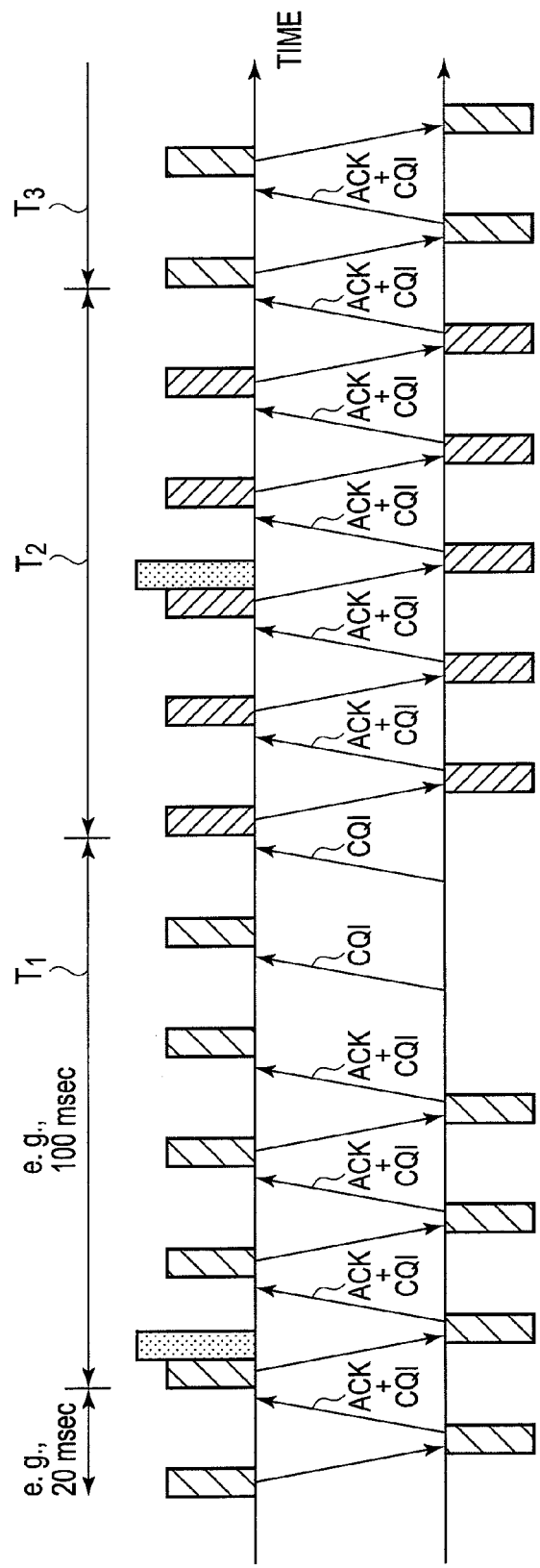
FIG. 10

BASE STATION AND METHOD

TECHNICAL FIELD

The present invention relates to a base station and a method, which are used in a mobile communication system.

BACKGROUND ART

In an existing mobile communication system, such as high-speed downlink packet access (HSDPA: High Speed Downlink Packet Access), an adaptive modulation and a channel coding (AMC: Adaptive Modulation and Channel coding) are performed in order to improve a data throughput (particularly, a data throughput in a downlink).

In the AMC, the modulation method and the channel coding ratio are appropriately changed (in every TTI (Transmission Time Interval) of about 0.5 ms in an extreme example) depending on the quality of a channel condition. Accordingly, the data can be transmitted by a larger amount and at a higher speed.

In particular, the AMC can greatly improve the throughput when data having a long packet length is transmitted.

In the AMC, it is required to notify, to a user equipment, an appropriate modulation method and a channel coding ratio for a downlink data channel (shared data channel), in each downlink data transmissions. Such notification is performed by utilizing a downlink control channel that is referred to as an L1/L2 control channel (L1/L2 signaling channel).

The L1/L2 control channel includes information essential for decoding the downlink data on the downlink data channel (may include not only information relating to the AMC, but also information relating to a frequency resource block used for the downlink data transmission or the like). For this reason, the L1/L2 control channel has to be transmitted along with the downlink data channel, for every downlink data channel transmission.

Accordingly, when downlink data having a short packet length is frequently transmitted, a ratio of a radio resource assigned to the L1/L2 control channel (downlink control channel) is increased while a radio resource assigned to the downlink data channel is decreased. This is because the L1/L2 control channel has to be transmitted while being associated by all the downlink data channels each transmitting the downlink data.

Here, representative examples of data generated frequently and having a short packet length include a voice packet, a packet for VoIP, and real time data.

In order to cope with such an inconvenience, a technique referred to as "Persistent Scheduling" has been proposed.

In this technique, downlink data (typically, a voice packet) is transmitted via a downlink data channel by one fixed transmission format in a predetermined cyclic period, for example, 20 ms.

Such a transmission format includes information necessary for decoding the downlink data on the downlink data channel, such as the modulation method and the channel coding ratio.

For example, such technique is configured so that the modulation method is fixedly set to "QPSK," that the channel coding ratio is fixedly set to "1/3," and that the transmission format including the modulation method and the channel coding ratio is known to a base station and a user equipment.

Accordingly, the user equipment can properly receive the downlink data on the downlink data channel without receiving the downlink control channel such as the L1/L2 control channel.

It is also proposed that two types of transmission formats are prepared as the aforementioned transmission format. In this case, the L1/L2 control channel is not used either.

In this case, the user equipment tries to decode the downlink data on the downlink data channel by using both of the two types of the transmission formats. Then, the downlink data having been successfully decoded will be used in further processing in a subsequent stage. Such a technique is also referred to as "Blind Detection."

In any case, the persistent scheduling deals with the above-mentioned problem by decreasing options of the transmission format of the downlink data channel that transmits the downlink data such as a voice packet, thereby omitting the L1/L2 control channel.

Note that, such persistent scheduling is described in, for example, non-patent document 1 and non-patent document 2.

Further, in the mobile communication system based on an OFDM (Orthogonal Frequency Division Multiplexing) technique, it has also been known that performing a power balance control (transmission power control) at a sub-carrier level in addition to the AMC is effective in order to improve the utilization efficiency of the frequency (for example, see non-patent document 3 and non-patent document 4).

Furthermore, as a method for indirectly notifying a propagation loss in the downlink in order to perform the transmission power control, performing a transmission power control by using a CQI is known. Applying such method to an L1/L2 control channel has also been proposed (for example, see non-patent document 5 and non-patent document 6).

However, in the above-described technique, the number of options of the transmission format of the downlink data channel is considerably limited (is limited to approximately the number making the blind detection executable). Accordingly, the above-described technique has a disadvantage from the viewpoint of improving the downlink data transmission efficiency in consideration of the channel condition.

Non-Patent Document 1

R1-051511, 7-11 Nov. 2005, 3GPP TSG-RAN WG1 #43, Qualcomm Europe, page 2, Section 3

Non-Patent Document 2

R2.060550, 13-17 Feb. 2006, 3GPP TSG-RAN WG2 #51, Qualcomm Europe, page 1, Section 2

Non-Patent Document 3

Nakanishi, Sanpei, Morinaga, "Study on Interference Reduction Technique in One Cell Repeating OFDM/TDMA System Using Sub-carrier Proper Modulation Method," Technical Report of the Institute of Electronics, Information and Communication Engineers, RCS2003-239, January 2003

Non-Patent Document 4

Yokomakura, Sanpei, Morinaga, "Study on Notification of Adjacent Cell Interference Power in One Cell Repeating TDMA System Using OFDM Proper Modulation Method," the 2004 IEICE General Conference, B-5-54, 2004

Non-Patent Document 5

3GPP TSG R1:R1-051145

Non-Patent Document 6

3GPP TSG R1:R1-051393

DISCLOSURE OF THE INVENTION

In this regard, the present invention has been made in view of the foregoing problems. An object of the present invention is to provide a base station and a method, in which a downlink data transmission efficiency can be improved in a mobile communication system configured to transmit downlink data to a user equipment by a predetermined cyclic period by using an existing transmission format.

A first aspect of the present invention is summarized as a base station performing a radio communication with a user equipment, including: a transmission format determining unit configured to determine a transmission format of a downlink data channel not to be associated by a control channel, based on a downlink reception signal quality measured by the user equipment; a notification unit configured to notify, to the user equipment, the transmission format determined by the transmission format determining unit; a transmission power controlling unit configured to control a transmission power of the downlink data channel; and a transmitting unit configured to transmit downlink data to the user equipment via the downlink data channel, by using the transmission format determined by the transmission format determining unit.

In the first aspect of the present invention, the notification unit may be configured to notify, to the user equipment, the transmission format determined by the transmission format determining unit, by using the downlink data channel.

In the first aspect of the present invention, the notification unit may be configured to notify, to the user equipment, the transmission format determined by the transmission format determining unit, by using an RRC signaling message.

In the first aspect of the present invention, the notification unit may be configured to notify, to the user equipment, the transmission format determined by the transmission format determining unit, by using an MAC control protocol data unit.

In the first aspect of the present invention, the transmitting unit may be configured to transmit downlink data via the downlink data channel, in a first cyclic period, and the notification unit may be configured to notify, to the user equipment, the transmission format determined by the transmission format determining unit, by using the control channel, in a second cyclic period that is longer than the first cyclic period.

In the first aspect of the present invention, the transmission power controlling unit may be configured to control the transmission power of the control channel.

In the first aspect of the present invention, the transmission format determining unit may be configured to determine the transmission format of the downlink data channel, based on the downlink reception signal quality multiplexed on a response signal for the downlink data channel, the response signal being transmitted from the user equipment.

In the first aspect of the present invention, the transmission format determining unit may be configured to determine the transmission format of the downlink data channel, based on the downlink reception signal quality multiplexed on an uplink data channel transmitted at a fixed timing in an uplink.

A second aspect of the present invention is summarized as a method used in a base station performing a radio communication with a user equipment, comprising: determining a transmission format of a downlink data channel not to be associated by a control channel, based on a downlink reception signal quality measured by the user equipment; notifying, to the user equipment, the transmission format determined by the transmission format determining unit; controlling a transmission power of the downlink data channel; and transmitting downlink data to the user equipment via the downlink data channel, by using the transmission format determined by the transmission format determining unit.

BRIEF DESCRIPTION OF THE DRAWINGS

FIG. 3(a) and FIG. 3(b) are illustrations showing the power balancing.

FIG. 10 is a timing chart before and after change of a transmission format of a downlink data channel.

BEST MODE FOR CARRYING OUT THE INVENTION

Figure 1:
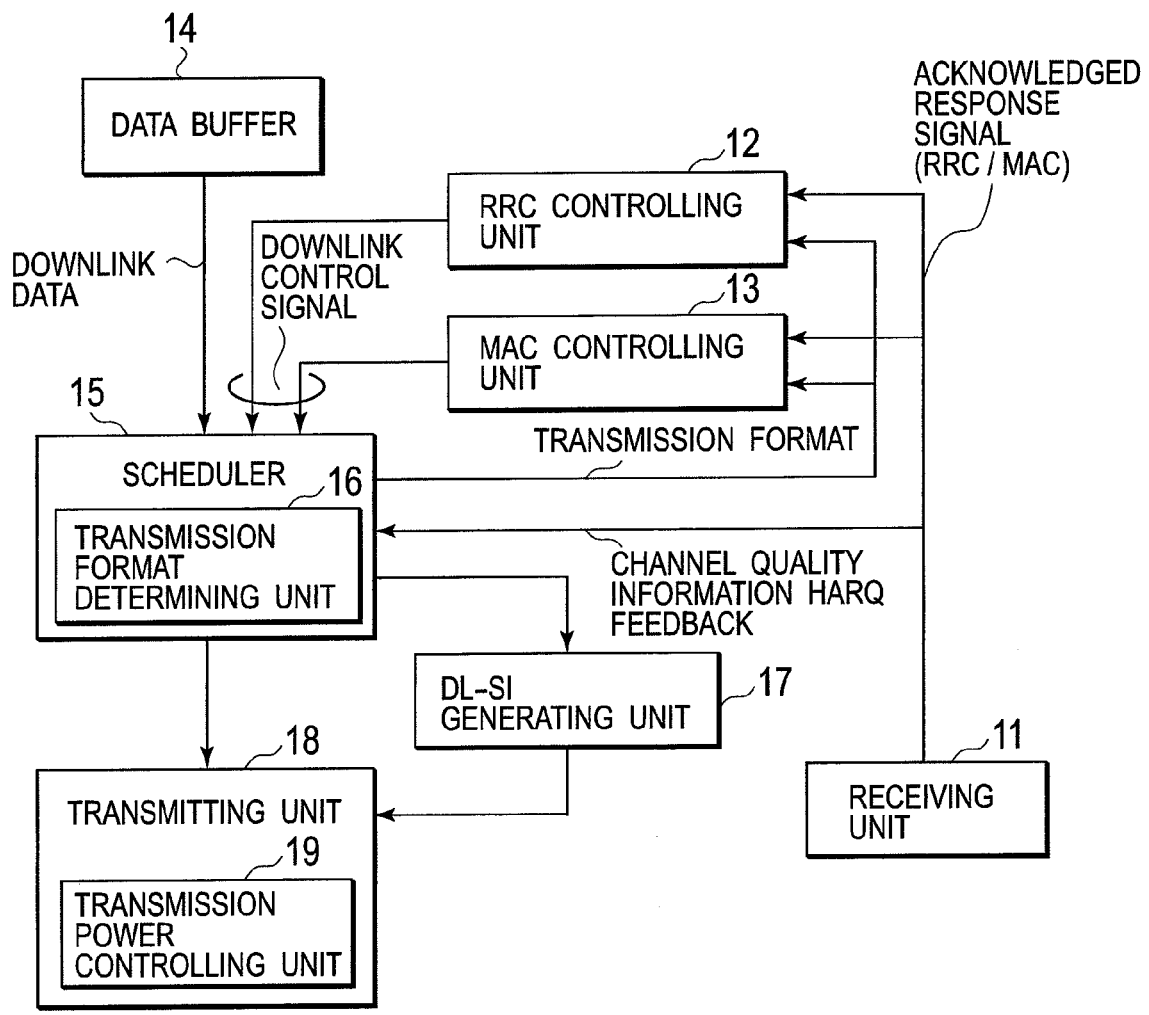
FIG. 1 is a partial block diagram of a base station according to one embodiment of the present invention.

An embodiment of the present invention will be described by referring to the drawings. In all the drawings for describing the embodiment of the present invention, identical numerals are used for components having the same function, and redundant explanation will be omitted.

Firstly, a mobile communication system according to a first embodiment of the present invention will be described.

FIG. 1 is a functional block diagram of a base station (eNodeB) according to the first embodiment of the present invention. FIG. 1 conceptually depicts an entity which particularly relates to the present invention.

Figure 2:
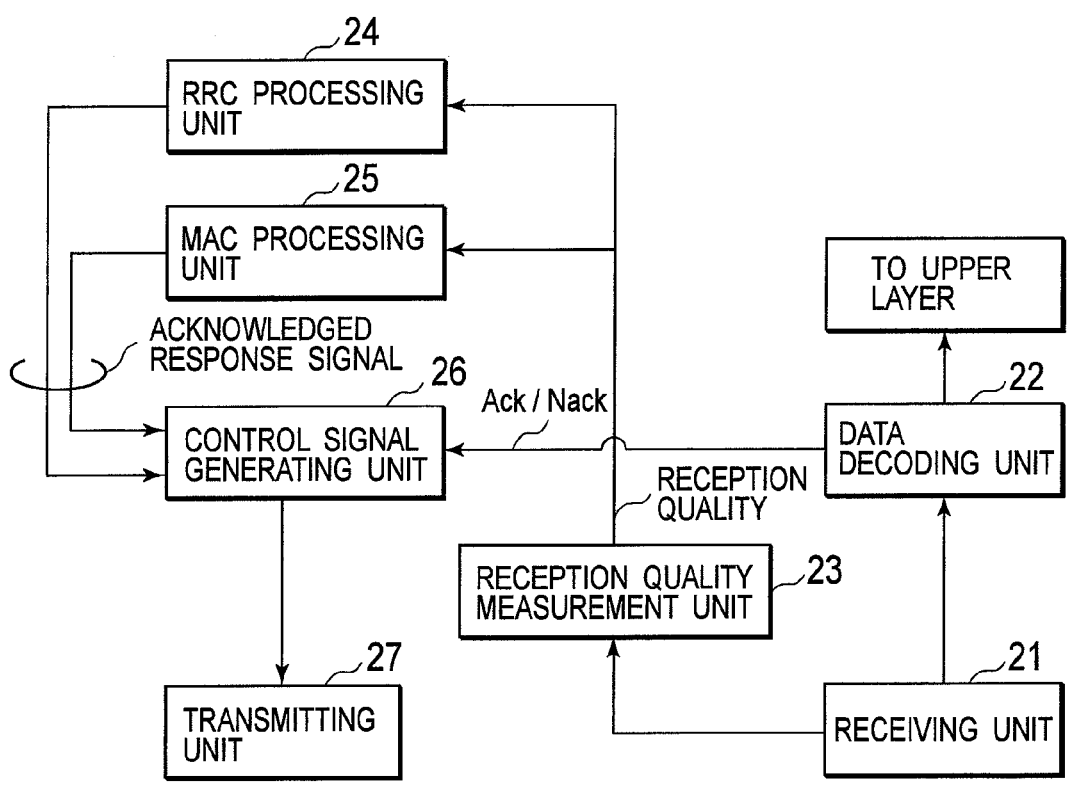
FIG. 2 is a partial block diagram of a user equipment according to one embodiment of the present invention.

The base station is configured to perform a radio communication with a user equipment as shown in FIG. 2, and to perform a communication with an upper apparatus (not shown).

As shown in FIG. 1, the base station includes a receiving unit 11, an RRC controlling unit (radio resource controlling unit) 12, an MAC controlling unit (media access controlling unit) 13, a data buffer 14, a scheduler 15, a transmission format determining unit 16, a downlink scheduling (DL-SI) information generating unit 17, a transmitting unit 18, and a transmission power controlling unit 19.

The receiving unit 11 is configured to receive a signal from the user equipment as shown in FIG. 2.

The RRC controller 12 is configured to control processing in an RRC sub-layer, for example, to perform management of a radio resource, setting of a radio bearer, or the like.

In particular, in the present invention, the RRC controller 12 is configured to generate a RRC signaling message showing a content or changed content of a transmission format of the downlink data channel.

The MAC controller 13 is configured to control processing in a MAC sub-layer, for example, to control a parameter relating to scheduling of data transmission.

In particular, in the present invention, the MAC controlling unit 13 is configured to generate an MAC control message (MAC control protocol data unit) showing content or changed content of the transmission format of the downlink data channel.

The data buffer 14 is configured to store traffic information to be transmitted to the user equipment. The traffic information may include data having a short packet length such as a voice packet, in addition to data having a long packet length. The traffic information may also include real time data or non-real time data.

The scheduler 15 is configured to perform a scheduling of the downlink data channel, based on the control messages and channel quality information. Here, the control messages are received from the RRC controlling unit 12 and the MAC controlling unit 13, and the channel quality information is received from the user equipment.

The transmission format determining unit 16 is configured to determine the transmission format, such as the modulation method or the channel coding ratio, which is applied to the downlink data channel.

The scheduler 15 is configured to make the determination on other matters such as the transmission timing or a frequency resource block.

The DL-SI information generating unit 17 is configured to generate a downlink control channel (L1/L2 control channel) for transmitting the information showing the scheduled content.

The transmitting unit 18 is configured to transmit the downlink data channel and the downlink control channel according to the scheduled content.

The transmission power controlling unit 19 is configured to control the transmission power of the downlink data channel and the downlink control channel.

For example, the transmission power controlling unit 19 is configured to perform such transmission power control for each frequency resource block or each sub-carrier.

In addition, for example, as shown in FIG. 3(*a*) and FIG. 3(*b*), the transmission power controlling unit 19 is configured to set a total transmission power to be constant, so that a large transmission power is assigned to a frequency resource block or a sub-carrier having an unfavorable reception power, and that a small transmission power is assigned to a frequency resource block or a sub-carrier having a favorable reception power.

FIG. 2 is a functional block diagram of the user equipment (UE) according to the first embodiment of the present invention. The user equipment is typically a mobile station, but may be a fixed station. FIG. 2 conceptually depicts an entity which particularly relates to the present invention.

As shown in FIG. 2, the user equipment includes a receiving unit 21, a data decoding unit 22, a reception quality measurement unit 23, an RRC processing unit 24, an MAC processing unit 25, a control signal generating unit 26, and a transmitting unit 27.

The receiving unit 21 is configured to receive a signal transmitted from the base station.

The data decoding unit 22 is configured to decode the downlink data on the downlink data channel or a downlink control signal on the downlink control channel, which are received by the receiving unit.

The reception quality measurement unit 23 is configured to measure a reception quality of a predetermined signal (typically, a pilot signal on a pilot channel) received by the receiving unit.

The reception quality may be expressed in any proper amount. For example, the reception quality may be expressed by a measured value, such as an SIR (Signal to Interference plus Noise Ratio), or may be expressed by a CQI (Channel Quality Indicator) in which the measured value is coded.

The RRC processing unit 24 is configured to perform a processing corresponding to the RRC controlling unit 12 shown in FIG. 1. In other words, the RRC processing unit 24 is configured to perform the processing relating to the RRC sub-layer.

In the present invention, the RRC processing unit 24 is configured to extract information relating to the transmission format change of the downlink data channel, from the received RRC signaling message.

The MAC processing unit 25 is configured to perform a processing corresponding to the MAC controlling unit 13 shown in FIG. 1. In other words, the MAC processing unit 25 is configured to perform a processing relating to the MAC sub-layer.

In the present invention, the MAC processing unit 25 is configured to extract information relating to the transmission format change of the downlink data channel, from the received MAC control message.

The control signal generating unit 26 is configured to generate an uplink control signal to be transmitted via an uplink control channel to the base station.

The transmitting unit 27 is configured to transmit the uplink control signal generated by the control signal generating unit 26, via the uplink control channel.

Note that, an element for transmitting uplink data via the uplink data channel is not shown in FIG. 2.

Figure 4:
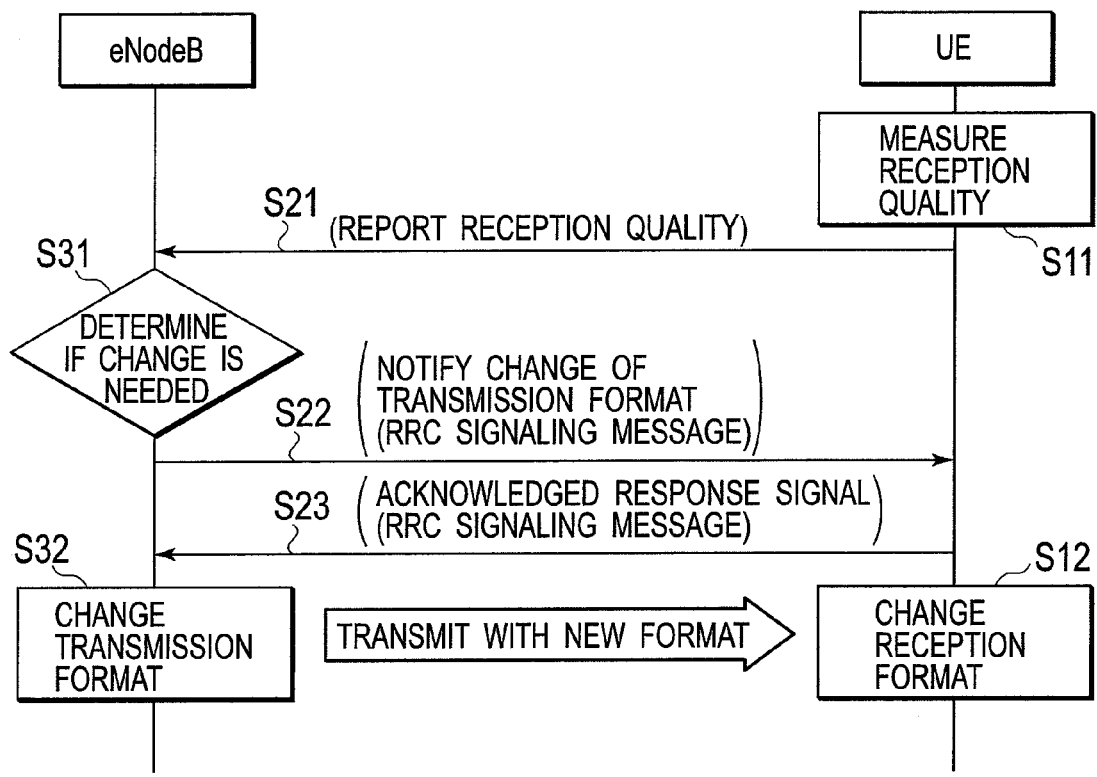
FIG. 4 is a flowchart showing an operational example of a mobile communication system according to one embodiment of the present invention.

FIG. 4 is a flowchart showing an operational example of the mobile communication system according to the first embodiment of the present invention.

As shown in FIG. 4, in step S11, the user equipment (UE) receives, from the base station (eNodeB), a pilot signal on a downlink pilot channel, and measures a downlink reception quality by using the pilot signal.

In step S21, the user equipment reports the measured downlink reception quality to the base station.

Here, the reception quality is generally reported for each frequency resource block prepared in the mobile communication system. However, the reception quality in which a plurality of frequency resource blocks is averaged may be representatively reported.

In step S31, the base station determines whether or not the transmission format to be used for the downlink data channel is changed, based on the downlink reception quality received from the user equipment.

In the present embodiment, the downlink data channel is transmitted by a predetermined cyclic period (first cyclic period) such as, for example, 20 ms. This transmission format is known to the base station and the user equipment.

Accordingly, the downlink control channel (L1/L2 control channel) is not associated by each of the downlink data channel that transmits the downlink data every 20 ms. Each of the data channel uses the same transmission format.

In other words, in step S31, it is determined if the transmission format should be subsequently maintained or changed.

Here, whether or not the transmission format has to be changed may be determined based on the reported downlink reception quality, or/and a correspondence relationship between the downlink reception quality and an MCS level.

The MCS level is configured so as to be specified by a number (MCS number) showing the combination of the modulation method and the channel coding ratio. In general, the MCS level is configured so that a bit rate becomes larger as the number becomes larger, and that a bit rate becomes smaller as the number becomes smaller.

However, in the present invention, not only such a correspondence relationship, any proper correspondence relationship may be used as the correspondence relationship between the downlink reception quality and the MCS level.

In addition, the number of the MCS levels to be prepared may be any number (may be prepared in a large number). In this regard, the present invention significantly differs from the conventional persistent scheduling in which the number of options of the MCS level is considerably limited.

Furthermore, in the present invention, the transmission power control is performed for each frequency resource block or each sub-carrier. Accordingly, the area coverage covered with the base station can be increased and the downlink reception quality can be improved even when the mobile station moves to a cell edge.

For this reason, when compared with the case where only the AMC is used, the reception quality in the downlink control channel and the downlink data channel can be improved.

In addition to the AMC, a power balance control (transmission power control) is performed at a frequency resource block level or a sub-carrier level, so that the MCS update frequency by the AMC can be decreased. Accordingly, in the present embodiment, the AMC is not performed based on an instantaneous reception quality, but is performed based on a reception quality obtained by smoothing in a longer section, compared with the AMC applied to the normal scheduling.

Moreover, the transmission power may be specified by associating the above-described reception quality with the MCS level, and the MCS level may be specified by a number (MCS number) showing the correspondence between the modulation method and the channel coding ratio transmission power.

In step S22, when it is determined that the transmission format of the downlink data channel is to be changed, the base station notifies, to the user equipment, the changed content of the transmission format.

In the example of FIG. 4, the base station notifies, to the user equipment, the changed content, by using an RRC signaling message. In other words, the base station transmits the RRC signaling message that includes the information (change notification) showing the changed content, via the downlink data channel, by using the transmission format known to the user equipment.

Figure 5:
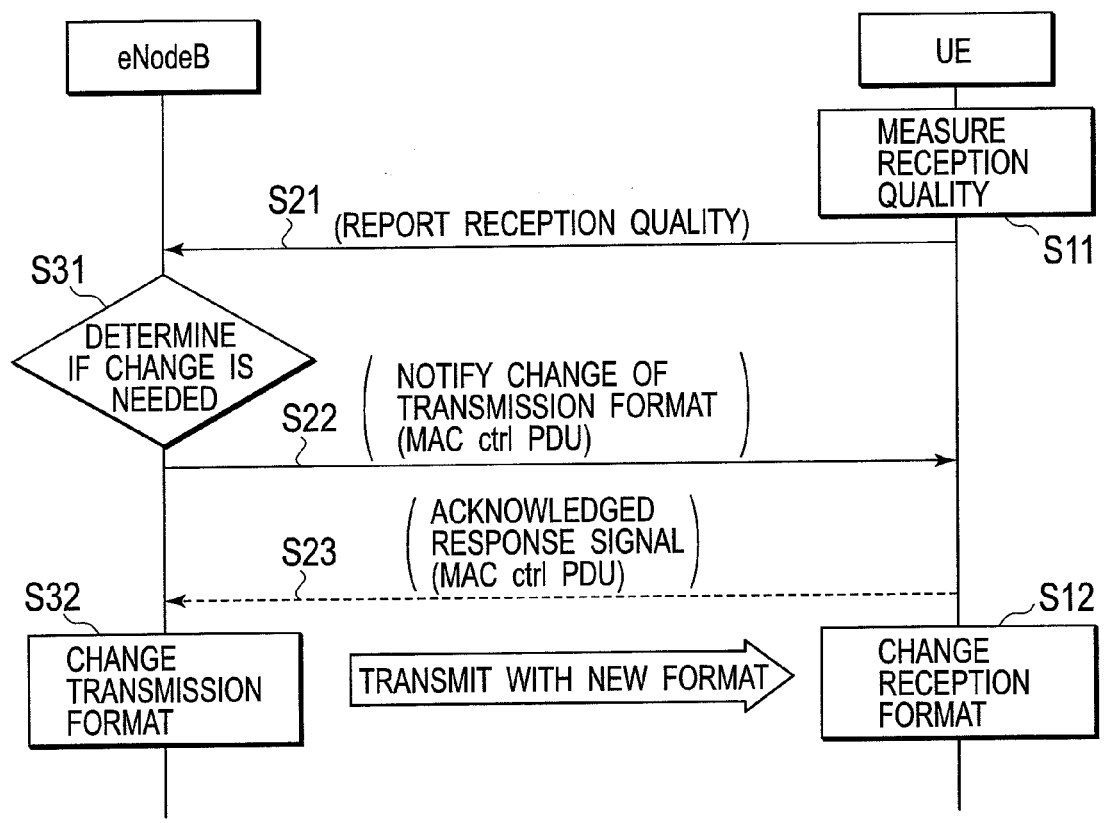
FIG. 5 is a flowchart showing an operational example of a mobile communication system according to one embodiment of the present invention.

Note that, the change notification may be configured to be transmitted by using the RRC signaling message as described above. Alternatively, as shown in FIG. 5, the change notification may be configured to be transmitted by using an MAC control protocol data unit (MAC-ctrl-PDU)(this has been mentioned in the foregoing description as the MAC control message).

In step S23, the user equipment that has properly received the above-described change notification reports, to the base station, an acknowledged response signal for notifying that the change notification is properly received. The acknowledged response signal may be transmitted via any uplink control channel.

Such acknowledged response signal is not essential. However, from a viewpoint of improving a reliability relating to the transmission format change, it is preferable that some kind of acknowledged response signal be notified from the user equipment to the base station.

In the example of FIG. 4, the acknowledged response signal is transmitted as the RRC signaling message. As shown in FIG. 5, the acknowledged response signal may be transmitted by the MAC-ctrl-PDU.

In step S32, the base station changes the transmission format of the downlink data channel to the new transmission format determined in step S31. Then, the base station transmits the downlink data via the downlink data channel, by a predetermined cyclic period to be described later (for example, every 20 ms) by using the changed transmission format.

In step S12, the user equipment receives the downlink data transmitted via the downlink data channel by a predetermined cyclic period by using the changed transmission format.

Figure 6:
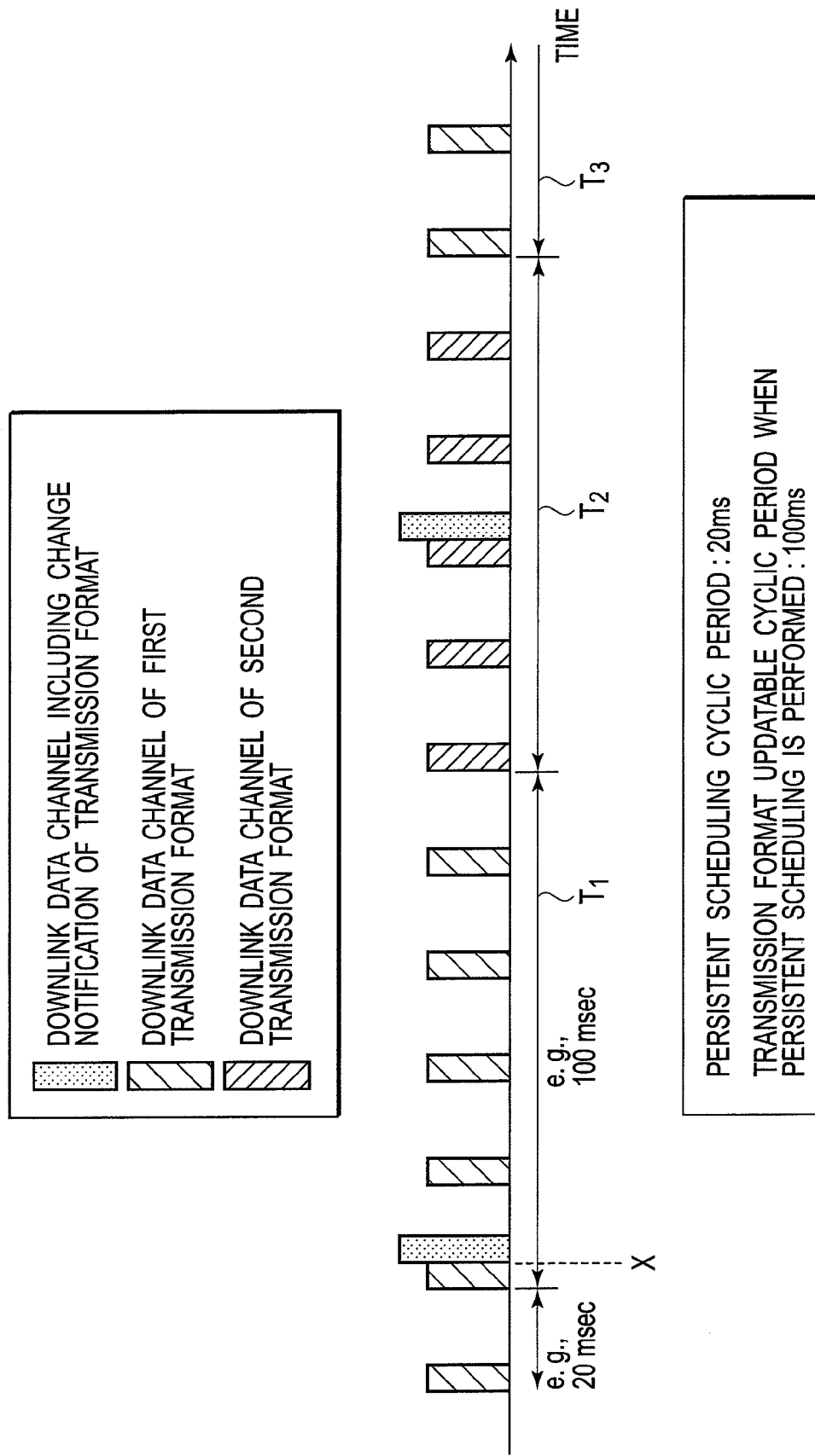
FIG. 6 is a timing chart before and after the change of a transmission format of a downlink data channel.

FIG. 6 shows an example of a timing chart before and after the change of the transmission format. The example of FIG. 6 shows a signal transmitted from the base station (it may be mentioned as a signal received by the mobile station).

In general, the downlink data is periodically transmitted via the downlink data channel in every 20 ms. In an example of FIG. 6, a same transmission format is used over a period of at least 100 ms.

In the first period $T_1$, a first transmission format is used for all of the downlink data channels that transmit the downlink data.

In the second period $T_2$, a second transmission format different from the first transmission format is used for all of the downlink data channels that transmit the downlink data.

In the example of FIG. 6, the change notification for notifying that the following format is to be changed is transmitted at time point X in the first period $T_1$. The change notification indicates that the transmission format of the downlink data has to be changed from the first transmission format to the second transmission format. In response to this change notification, the transmission format used in the second period $T_2$ is changed.

Note that, the time point of transmitting the downlink data channel not including the change notification and the time point of transmitting the downlink data channel including the change notification are depicted as being different from each other for simplifying the illustration. However, this is not essential for the present invention.

The above-described change notification may be transmitted at any given time point coming in a predetermined cyclic period (every 20 ms), or the change notification may be transmitted at a time point other than the predetermined cyclic period. However, the downlink data channel transmitting the change notification at any time point independent of the predetermined cyclic period is the normal downlink data channel that is associated by the L1/L2 control channel each designating the transmission format.

In the example of FIG. 6, in response to the change notification transmitted during the first period the transmission format used in the second period $T_2$ is changed. However, the transmission format may be changed later than that period.

The change notification may also include the information showing the time when the transmission formation is to be changed.

Alternatively, as shown in FIG. 4 and FIG. 5, the transmission format may be actually changed by the base station after the acknowledged response signal is obtained from the user equipment. In this case, in a period when the acknowledged response signal is not obtained, the first transmission format is still continuously used. In the example of FIG. 6, in response to the change notification transmitted during the second period $T_2$, the transmission format used in the successive third period $T_3$ is changed to the first transmission format.

In the above-described example, both determinations (A) and (B): (A) whether or not to change the transmission format, and (B) to which format the transmission format should be changed, are performed at the base station. However, it may be configured such that the user equipment may perform the determination (A) and the base station may perform only the determination (B).

Next, a mobile communication system according to a second embodiment of the present invention will be described.

Figure 7:
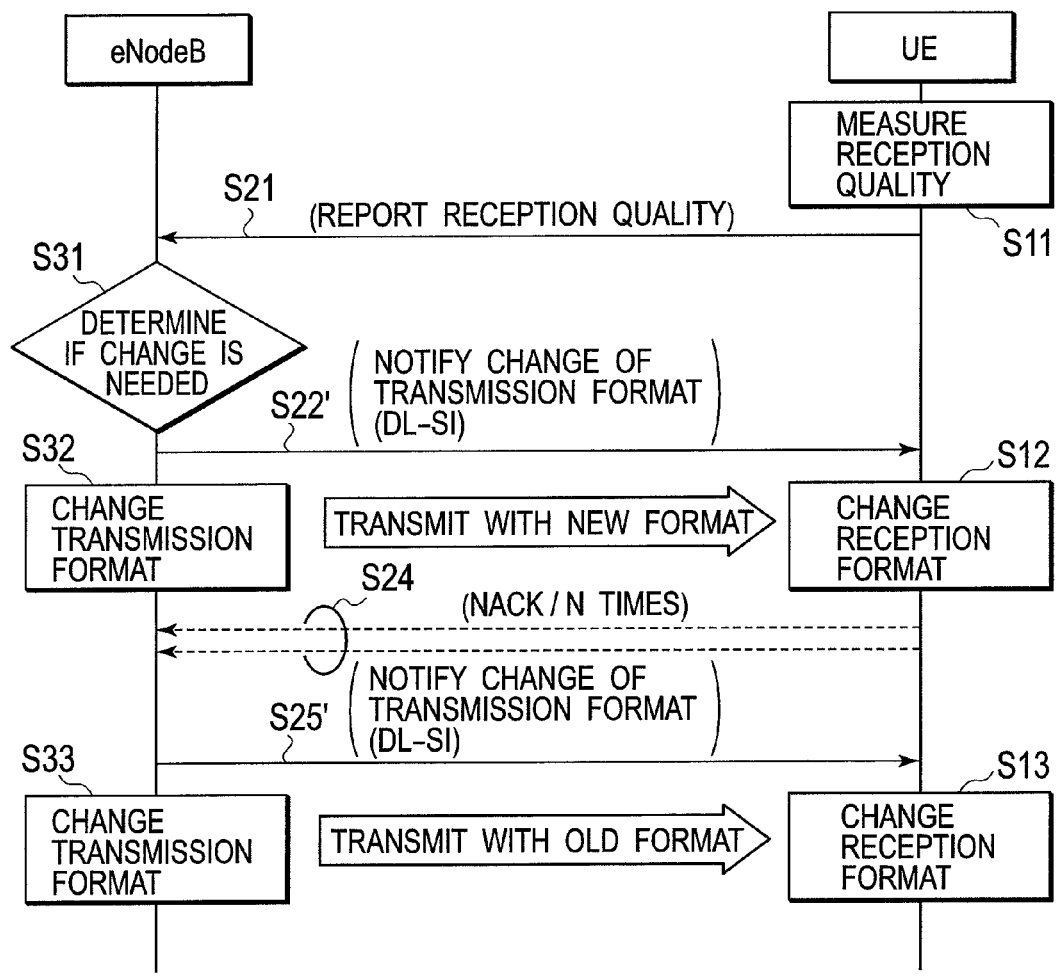
FIG. 7 is a flowchart showing an operational example of a mobile communication system according to one embodiment of the present invention.

FIG. 7 is a flowchart showing an operational example of a mobile communication system according to the second embodiment of the present invention. An outline of such operation is similar to the operation described in FIG. 4, but a signal to be used for the change notification of the transmission format is different.

In the present embodiment, the base station is configured to transmit the change notification by using a downlink control channel that is transmitted separately from a downlink data channel.

The downlink control channel transmits downlink scheduling information (DL-SI) by a predetermined cyclic period. The predetermined cyclic period is set to be longer than a transmission frequency (20 ms) of the downlink data channel, for example, 100 ms.

Figure 8:
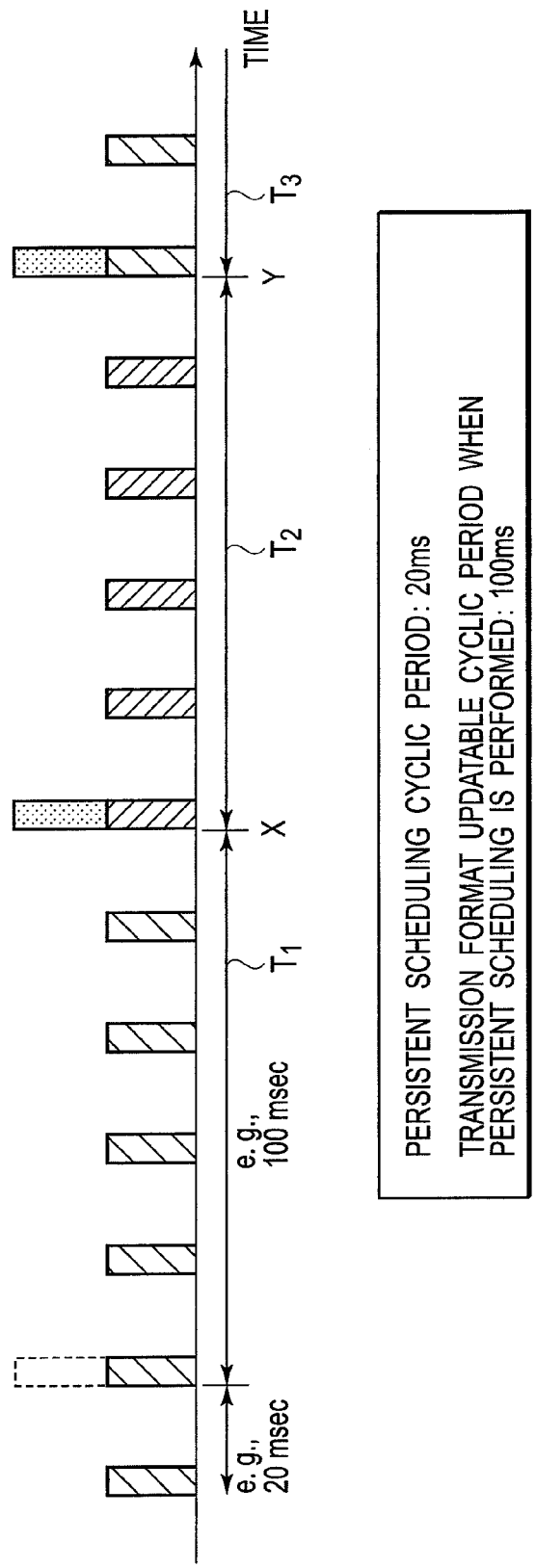
FIG. 8 is a timing chart before and after the change of a transmission format of a downlink data channel.

FIG. 8 shows a timing chart before and after the change of the transmission format.

As shown in FIG. 8, the downlink data is transmitted in a first cyclic period (20 ms) via the downlink data channel. In addition, a downlink control signal (the above-described change notification) is transmitted in a second cyclic period (100 ms) via the above-described downlink control channel (DL-SI).

Here, the second cyclic period may be the same as the "period" described in FIG. 6.

In the first period $T_1$, the transmission formation is not changed, and the first transmission format, which is the same as the transmission format used in the preceding period, is used.

In the second period $T_2$, the transmission format is changed to the second transmission format, and the information notifying the change of the transmission format (DL-SI) is transmitted at the beginning X of the second period $T_2$, via the downlink control channel.

Furthermore, in the third period $T_3$, the transmission format is changed back to the original first transmission format. The information notifying the change of the transmission format (DL-SI) is transmitted at the beginning Y of the third period $T_3$, via the downlink control channel.

In the present embodiment, in a case where the transmission format is changed, the information notifying the change of the transmission format is transmitted at the beginning of each period (more generally, at any given time point set in advance). Accordingly, the base station is not required to notify, to the user equipment, the change timing of the transmission format.

Next, a mobile communication system according to a third embodiment of the present invention will be described.

Figure 9:
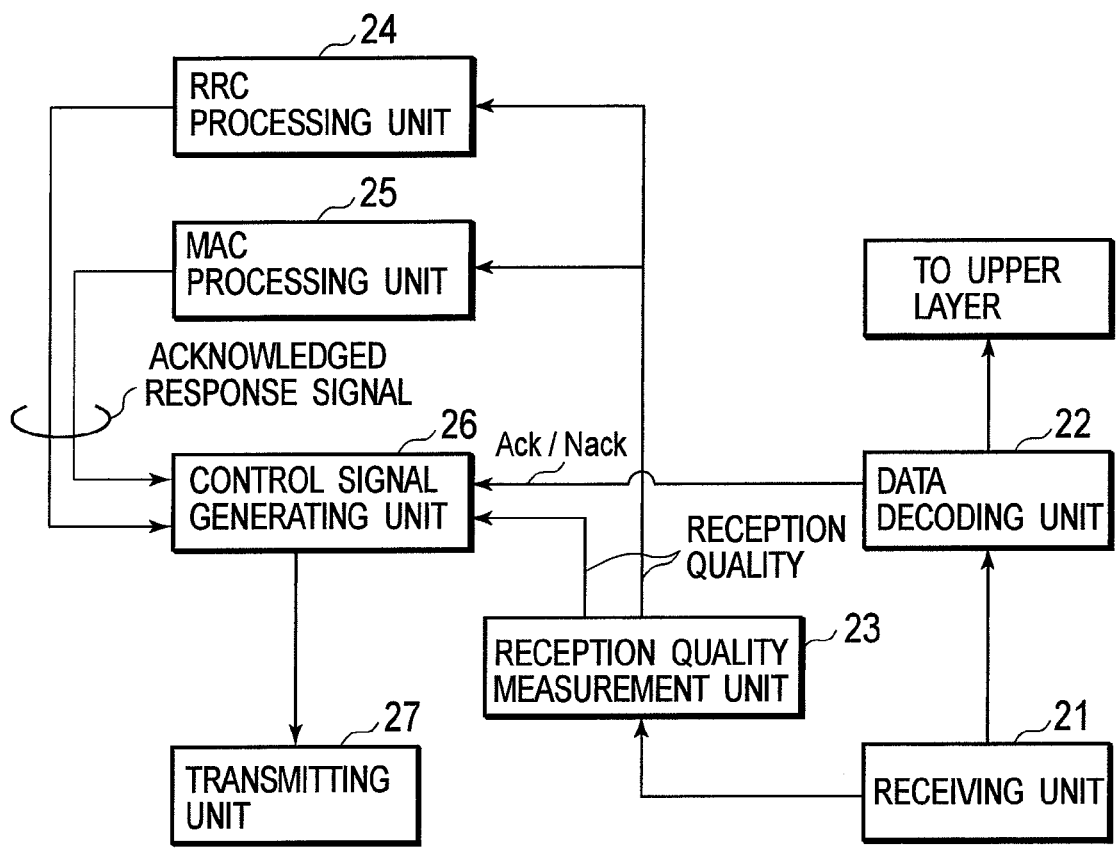
FIG. 9 is a partial block diagram of a user equipment according to one embodiment of the present invention.

FIG. 9 is a partial block diagram of a user equipment according to a third embodiment of the present invention. An outline of such user equipment is similar to the function of the user equipment described in FIG. 4, but a method for reporting a downlink reception quality is different.

In the present embodiment, the user equipment is configured to transmit the above-described reception quality (CQI) of the downlink, by an "HARQ feedback" to the downlink data for the downlink data channel transmitted at a fixed timing, or by multiplexing the reception quality (CQI) on an uplink data channel transmitted at the fixed timing, in accordance with the transmission condition of the data traffic.

Specifically, as shown in FIG. 10, when the downlink data is transmitted from the base station to the user equipment, the user equipment is configured to transmit the reception quality (CQI) of the above-described downlink, by multiplexing the reception quality (CQI) on the acknowledged response signal (ACK/NACK) for the downlink data.

On the other hand, when the downlink data is not transmitted from the base station to the user equipment, the user equipment is configured to transmit the reception quality (CQI) of the above-described downlink, by multiplexing the reception quality (CQI) on the uplink data channel transmitted at the fixed timing.

According to the above-described configuration, the transmission frequency of the reception quality (CQI) of the downlink for averaging in a longer section can be increased, while reducing the overhead of the physical channel for notifying the downlink reception quality (CQI).

Note that, the entire content of Japanese Patent Application No. 2006-169441 (filed on Jun. 19, 2006) is incorporated herein by reference.

In addition, the entire content of "R1-051511, 7-11 Nov. 2005, 3GPP TSG-RAN WG1 #43, Qualcomm Europe, Page 2, Section 3" is incorporated herein by reference.

Also, the entire content of "R2-060550, 13-17 Feb. 2006, 3GPP TSG-RAN WG2 #51, Qualcomm Europe, Page 1, Section 2" is incorporated herein by reference.

Also, the entire content of "Nakanishi, Sanpei, Morinaga, "Study on Interference Reduction Technique in One Cell Repeating OFDM/TDMA System Using Sub-carrier Proper Modulation Method," Technical Report of the Institute of Electronics, Information and Communication Engineers, RCS2003-239, January 2003" is incorporated herein by reference.

Also, the entire content of "Yokomakura, Sanpei, Morinaga, "Study on Notification of Adjacent Cell Interference Power in One Cell Repeating TDMA System Using OFDM Proper Modulation Method," the 2004 IEICE General Conference, B-5-54, 2004" is incorporated herein by reference.

Also, the entire content of "3GPP TSG R1:R1-051145" is incorporated herein by reference.

Also, the entire content of "3GPP TSG R1:R1-051393" is incorporated herein by reference.

As described above, the present invention has been described in detail by using the above-described embodiments. However, it is clear for those skilled in the art that the present invention is not limited to the embodiment described herein. The present invention can be implemented as modified and changed embodiments without departing from the purpose and scope of the invention which is defined by the description of the scope of claims. Accordingly, the description of the present specification is intended to provide exemplary description and does not have any meaning of limiting the present invention.

INDUSTRIAL APPLICABILITY

As described above, the embodiment of the present invention can provide a base station and a method, in which a downlink data transmission efficiency can be improved in a mobile communication system configured to transmit downlink data to a user equipment by a predetermined cyclic period by using an existing transmission format.

The invention claimed is:

1. A base station performing a radio communication with a user equipment and being included in a mobile communication system transmitting downlink data to be transmitted periodically in accordance with a persistent scheduling via a downlink data channel not associated by a control channel notifying a modulation method and a channel coding ratio applied to the user equipment, by using a transmission format including the modulation method and the channel coding ratio known to the user equipment, the base station comprising:
- a processor executing instructions that cause the base station to:
  - determine the transmission format including the modulation method and the channel coding ratio known to the user equipment, based on a downlink reception signal quality measured by the user equipment;
  - change the transmission format of the downlink data channel, based on the downlink reception signal quality multiplexed on a response signal for the downlink data channel, the response signal being transmitted from the user equipment;
  - notify, to the user equipment, the determined transmission format;
  - control a transmission power of the downlink data channel;
  - transmitter configured to transmit the downlink data to the user equipment via the downlink data channel, by using the determined transmission format and
  - wherein the notifying further comprises transmitting the downlink data via the downlink data channel in a first cyclic period, so as to notify, to the user equipment, the changed transmission format by using the control channel in a second cyclic period longer than the first cyclic period.

2. The base station according to claim 1, wherein the processor is further configured to notify, to the user equipment, the determined transmission format by using an RRC (radio resource control) signaling message.

3. The base station according to claim 1, wherein the processor is further configured to notify, to the user equipment, the determined transmission format by using an MAC (media access control) control protocol data unit.

4. The base station according to claim 1, wherein the processor is further configured to control the transmission power of the control channel.

5. The base station according to claim 1, wherein the processor is further configured to determine the transmission format of the downlink data channel, based on the downlink reception signal quality multiplexed on an uplink data channel transmitted at a fixed timing in an uplink.

6. A method used in a base station performing a radio communication with a user equipment being included in a mobile communication system transmitting downlink data to be transmitted periodically in accordance with a persistent scheduling via a downlink data channel not associated by a control channel notifying a modulation method and a channel coding ratio applied to the user equipment, by using a transmission format including the modulation method and the channel coding ratio known to the user equipment, the method comprising:
- determining the transmission format including the modulation method and the channel coding ratio known to the user equipment, based on a downlink reception signal quality measured by the user equipment;
- changing the transmission format of the downlink data channel, based on the downlink reception signal quality multiplexed on a response signal for the downlink data channel, the response signal being transmitted from the user equipment; notifying, to the user equipment, the determined transmission format;
- controlling a transmission power of the downlink data channel; and
- transmitting downlink data to the user equipment via the downlink data channel, by using the determined transmission format, wherein the downlink data is transmitted via the downlink data channel in a first cyclic period and notifying, to the user equipment, the changed transmission format by using the control channel in a second cyclic period longer than the first cyclic period.

* * * * *